United States Patent
Tas et al.

(10) Patent No.: US 11,204,788 B2
(45) Date of Patent: Dec. 21, 2021

(54) METHOD TO PROTECT AGAINST FILELESS INFECTION FROM COMMAND LINE INTERPRETERS OR DOCUMENTS

(71) Applicant: Comodo Security Solutions, Inc., Clifton, NJ (US)

(72) Inventors: Egemen Tas, North Bergen, NJ (US); Haibo Zhang, Beijing (CN); Sergey Kazakov, Odessa (UA)

(*) Notice: Subject to any disclaimer, the term of this patent is extended or adjusted under 35 U.S.C. 154(b) by 0 days.

(21) Appl. No.: 16/215,620

(22) Filed: Dec. 10, 2018

(65) Prior Publication Data
US 2019/0265994 A1 Aug. 29, 2019

Related U.S. Application Data

(60) Provisional application No. 62/597,249, filed on Dec. 11, 2017.

(51) Int. Cl.
*G06F 9/455* (2018.01)
*G06F 21/53* (2013.01)
*G06F 21/56* (2013.01)

(52) U.S. Cl.
CPC .......... *G06F 9/45512* (2013.01); *G06F 21/53* (2013.01); *G06F 21/566* (2013.01)

(58) Field of Classification Search
CPC ..... G06F 9/45512; G06F 21/53; G06F 21/566
See application file for complete search history.

(56) References Cited

U.S. PATENT DOCUMENTS

| 7,698,744 B2 | 4/2010 | Fanton et al. | |
|---|---|---|---|
| 2004/0205411 A1 | 10/2004 | Hong et al. | |
| 2005/0022018 A1* | 1/2005 | Szor ................... | H04L 63/145 726/4 |
| 2005/0071649 A1 | 3/2005 | Shipp | |
| 2005/0172338 A1 | 8/2005 | Sandu et al. | |
| 2008/0086012 A1 | 4/2008 | Yu et al. | |
| 2012/0266244 A1 | 10/2012 | Green et al. | |
| 2013/0091107 A1* | 4/2013 | San Andres ........ | G06F 9/45512 707/695 |
| 2013/0160127 A1* | 6/2013 | Jeong .................... | G06F 21/566 726/24 |
| 2014/0130158 A1* | 5/2014 | Wang .................... | G06F 21/566 726/23 |
| 2019/0102552 A1* | 4/2019 | Pavlyushchik ....... | G06F 21/568 |

OTHER PUBLICATIONS

Nir Nissim et al., ALDOCX: Detection of Unknown Malicious Microsoft Office Documents Using Designed Active Learning Method Based on New Structural Feature Extraction Methodology, IEEE, Mar. 3, 2017, retrieved online on Aug. 24, 2021, pp. 631-646. Retrieved from the Internet: <UR: https://ieeexplore.ieee.>. (Year: 2017).*

* cited by examiner

*Primary Examiner* — Hanh Thi-Minh Bui
(74) *Attorney, Agent, or Firm* — Joseph P. Aiena

(57) ABSTRACT

There is provided a method to detect script texts passed to interpreter and send them to security components, such as a scanner, whitelist and sandbox. The method is accomplished by extracting embedded script from command line parameters or documents, saving it to a script file and passing the file path to security components for scanning and further processing.

6 Claims, 10 Drawing Sheets

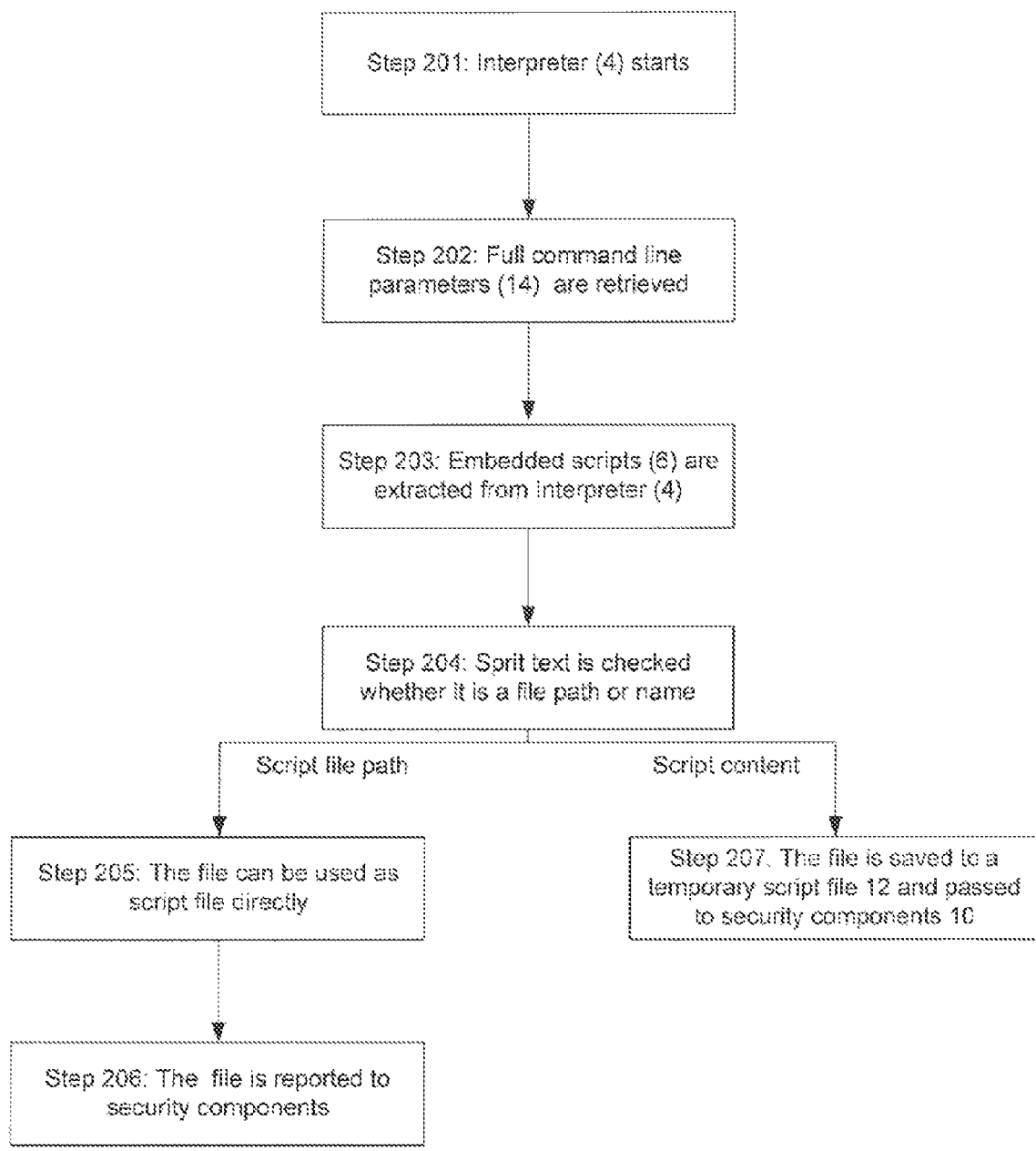

METHOD TO PROTECT AGAINST FILELESS INFECTION FROM COMMAND LINE INTERPRETERS OR DOCUMENTS

CROSS-REFERENCE TO RELATED APPLICATIONS

This application claims benefit of and priority to U.S. Provisional Application Ser. No. 62/597,249 filed on Dec. 11, 2017, and incorporated herein by reference in its entirety.

BACKGROUND

Now more and more malwares are implemented in scripts instead of traditional executable files. Script itself is not a portable executable file and they are usually executed by trusted interpreters like cmd or powershell in Windows OS, which makes itself invisible in process view, thus cannot be detected by antivirus suite easily. Meanwhile, it is much easier to get scripts embedded into webpage, email, documents and get them executed by browser, email client and doc tools.

Most modern antivirus products are able to detect script file passed to interpreters, however some interpreters accept script passed directly as parameters which is still difficult for antivirus product to detect. That is existing methods can only detect script file passed to interpreter command line using file path or name.

Thus, there is a need in more effective process for detection script texts passed to interpreter so to eliminate malware intrusion into computer system.

SUMMARY OF INVENTION

The current invention is a method and system that introduces a solution to detect script texts passed to interpreter and sends them to security components like scanner, whitelist and sandbox. The method of detecting script texts passed to interpreter and sending the script texts to security components comprises extracting embedded script from command line parameters or documents, saving embedded script to a script file, and passing the file path to security components for scanning, the security components include a scanner, a whitelist, or a sandbox, or all of these or any combination of each. The method includes an embodiment where an embedded script is retrieved from interpreter where the method comprises starting an interpreter, retrieving full command line parameters, then extracting embedded scripts from full command line parameters and checking if script text is a file path or name, then reporting the file to security components if it can be used as script file. If not, then the method saves the file to a temporary script file and passing it to security components.

In an embodiment, the method also includes where multiple pieces of scripts are executed in a single command comprising the steps of intercepting script text, saving all codes to temporary script file, and passing a script file to security components. In an embodiment, the method includes where interceptors do not accept scripts as parameter comprising the steps of extracting full parameter, treating parameter as embedded script, saving the parameter to a script file, reporting the script file, and passing a script file to security components. In an embodiment of the method, the embedded script is extracted from documents comprising launching the process in text editor that supports active content, detecting embedded script, saving embedded script to temporary embedded script file, and then passing the embedded script file to security components.

The method of the present invention is advantageous in that it detects attacks from fileless scripts.

BRIEF DESCRIPTION OF DRAWINGS

FIG. 2 is the process of the invention.

DETAILED DESCRIPTION

The present invention discloses the method and system to detect script texts passed to interpreter by extracting embedded script from command line parameters or documents, saving it to a script file and passing the file path to security components for scanning and further process.

Figure 1A:
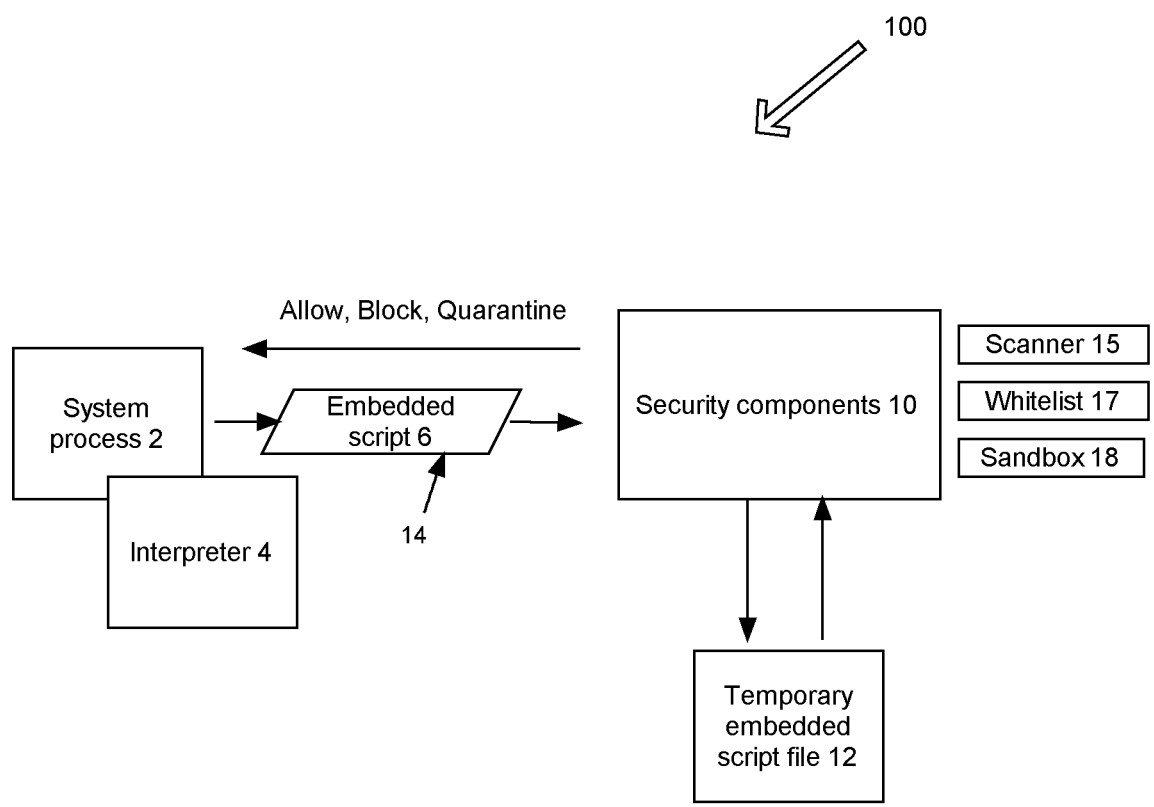
FIG. 1A is a depiction of general scheme and components of the invention.
Figure 1B:
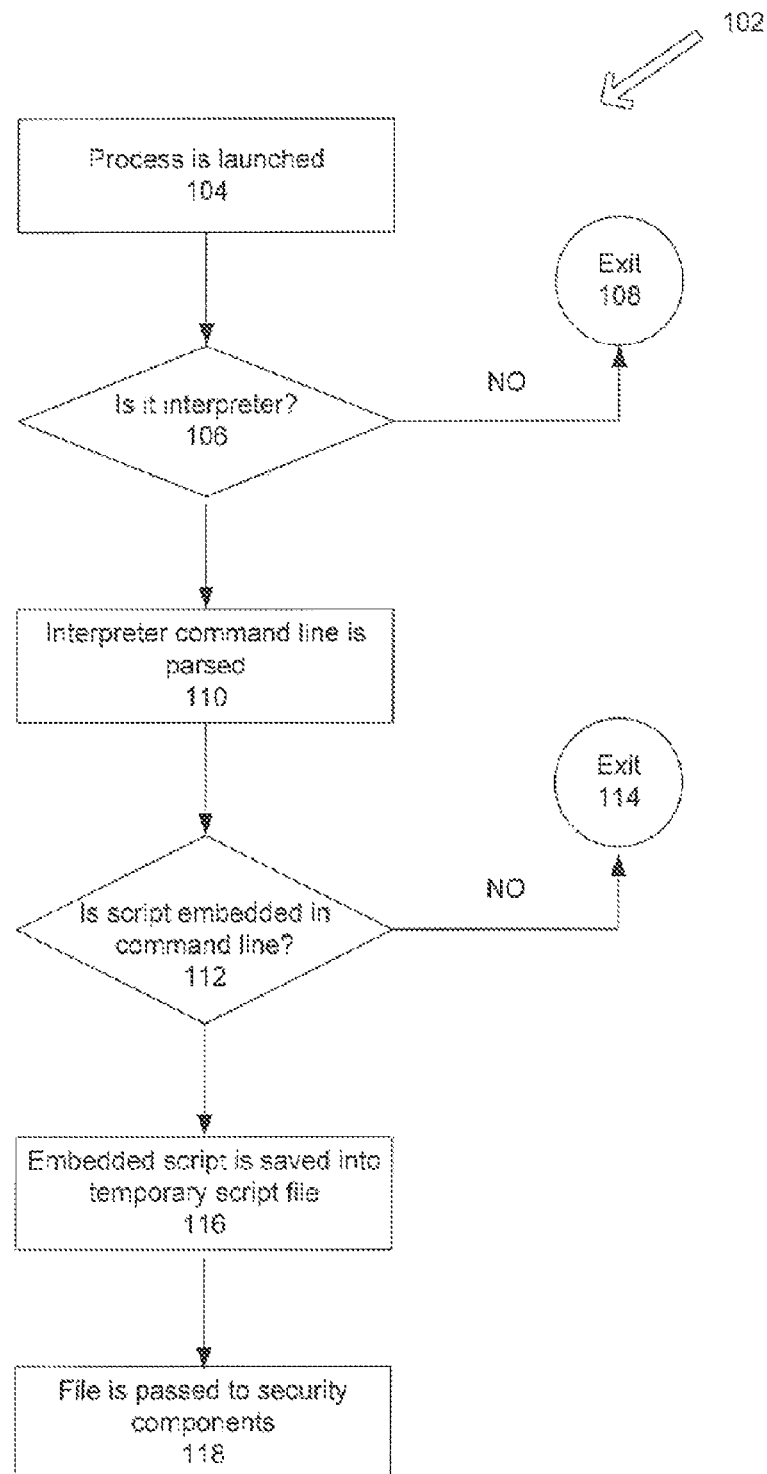
FIG. 1B is a flowchart of general scheme and components of the invention.

FIGS. 1A and 1B demonstrate depiction 100 and flowchart 102 of general scheme and components of the invention. There is a process 2 that launches interpreter 4 with embedded script 6 in command line 14. The embedded script 6 is checked by security components 10, i.e. scanner 15, whitelist 17, sandbox 18, either individually or one or more combinations thereof and saved as a temporary embedded script file 12. After verification with security components 10, the verdict to allow, block script execution or send it to quarantine is reached. As seen in FIG. 1B, the process is launched (Step 104) and a determination is then made if it is an interpreter (Step 106). If it is not, then the process is ended (Step 108). If it is an interpreter, the interpreter command line is parsed (Step 110). The process then determines if a script is embedded in the command line (Step 112). If there is no script, then the process exits/ends (Step 114). If there is an embedded script, the embedded script is saved into a temporary script file (Step 116). The file is then passed to security components 10 (Step 118).

FIG. 2 shows the process of the invention. In step 201 an interpreter 4 starts. In step 202 its full command line parameters 14 are retrieved. In step 203 embedded scripts 6 are extracted from it. There is a customized interceptor command line parser for different interceptors that accept script text as parameter, e.g. cmd.exe accept bat scripts after /c and /k, powershell.exe accepts ps scripts after -command and /command. In step 204 after script text is extracted, it is checked whether it is a file path or name, e.g. "cmd.exe/c c:\test.bat". In this case, step 205, the file can be used as script file directly. In step 206 the file is reported to security components 10. Otherwise the file is saved to a temporary script file 12 and is passed to security components 10, step 207. E.g. for "powershell.exe—command mkdir d:\dir1", it is extracted "mkdir d:\dir1" as embedded script 6 and is saved to a temporary bat file.

Figure 3:
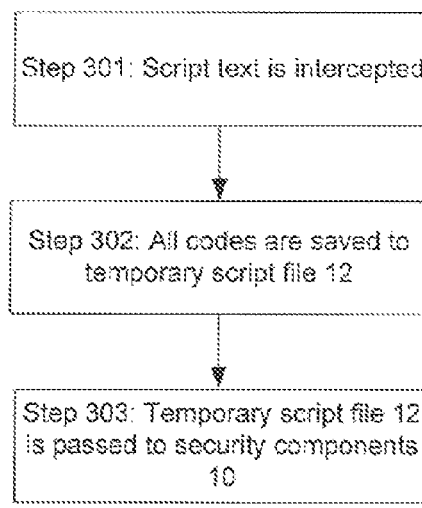
FIG. 3 is a flowchart of another embodiment of the invention where multiple pieces of scripts are executed in a single command.

FIG. 3 shows another embodiment of the invention where multiple pieces of scripts 6 are executed in a single command. In step 301 script text "perl.exe -e code1 -e code2" is intercepted. In step 302 all codes are saved to temporary script file 12. Further temporary script file 12 is passed to security components 10, step 303. E.g. for "perl.exe -e code1 -e code2", it is extracted "code1" and "code2" as single embedded script and is saved to a temporary script file.

Figure 4:
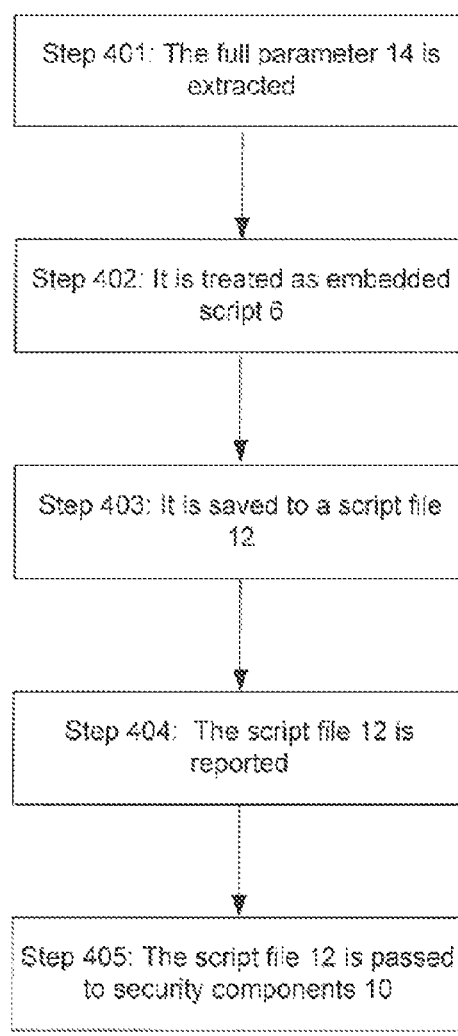
FIG. 4 is a flowchart of other embodiment of the invention where interceptors do not accept scripts as parameter.

FIG. 4 shows another embodiment of the invention where interceptors 4 do not accept scripts 6 as parameter 14. Consequently they can be used by malwares to perform special attacks in tricky ways. For example, rundll32.exe can be used to execute javascript codes by running "rundll32.exe javascript:"\..\mshtml,RunHTMLApplication";alert('foo');". In step 401 the full parameter 14 is extracted, i.e. "javascript:"\..\mshtml,RunHTMLApplication"; alert('foo');". In step 402 it is treated as embedded script 6. In step 403 it is saved to a script file 12. In step 404 the script file 12 is reported instead of reporting mshtml.dll which is unable to detect the threat. In step 405 script file 12 is passed to security components 10.

Figure 5A:
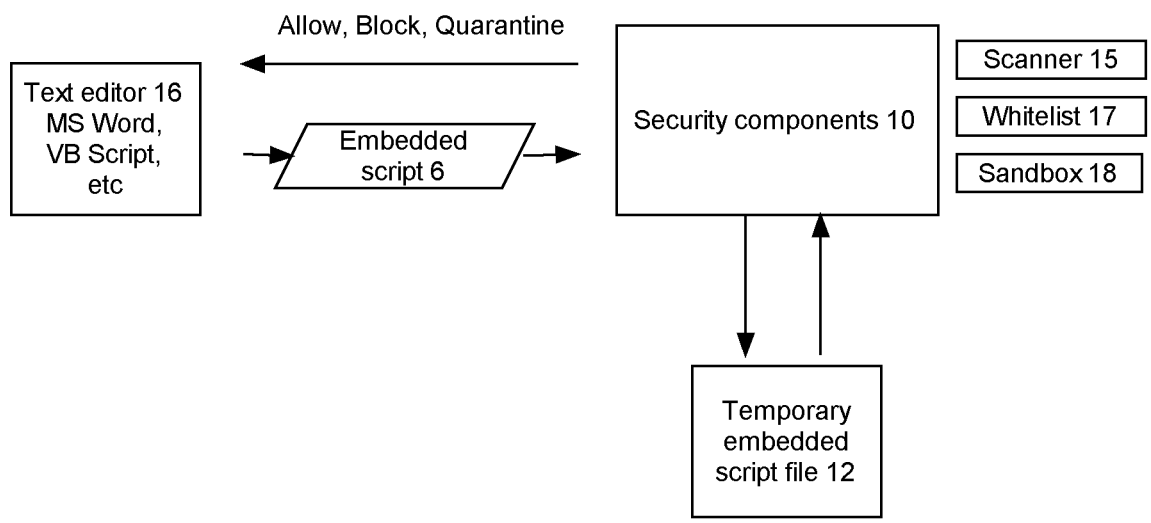
FIG. 5A is a depiction of other embodiment of the invention where embedded script is extracted from documents.
Figure 5B:
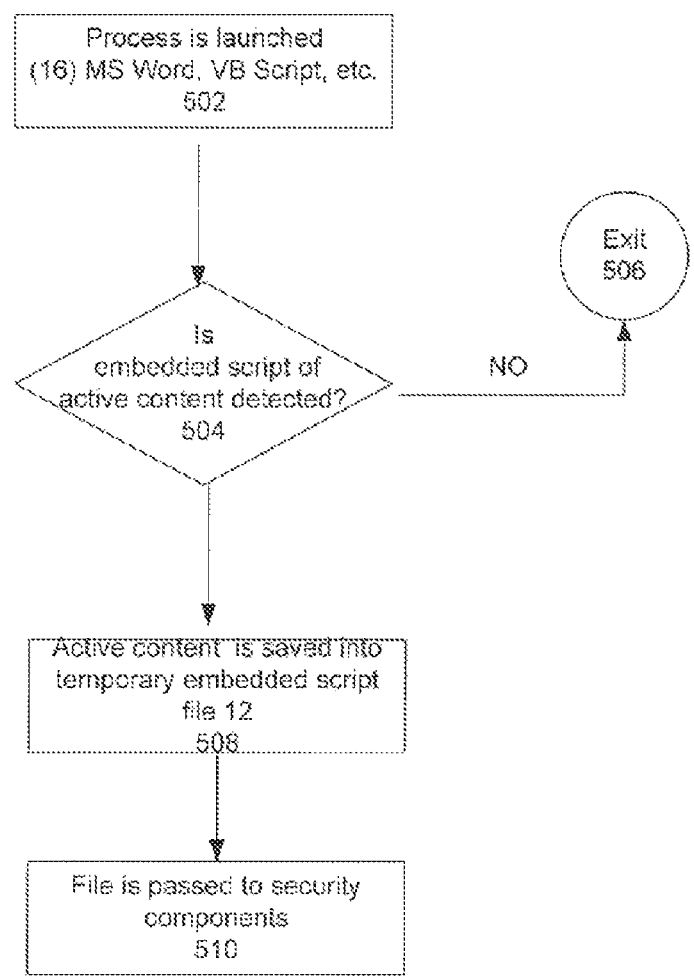
FIG. 5B is a flowchart of other embodiment of the invention where embedded script is extracted from documents.

FIGS. 5A and 5B demonstrate depiction and flowchart of other embodiment of the invention where embedded script is extracted from documents. In step 502, the process is lunched in text editor that supports active content 16 (for example, MS Word, VB script). In step 504, embedded script 6 is detected. In step 508, the embedded script 6 is saved to temporary embedded script file 12. In step 510, embedded script file 12 is passed to security components 10 (Step 510).

Figure 6:
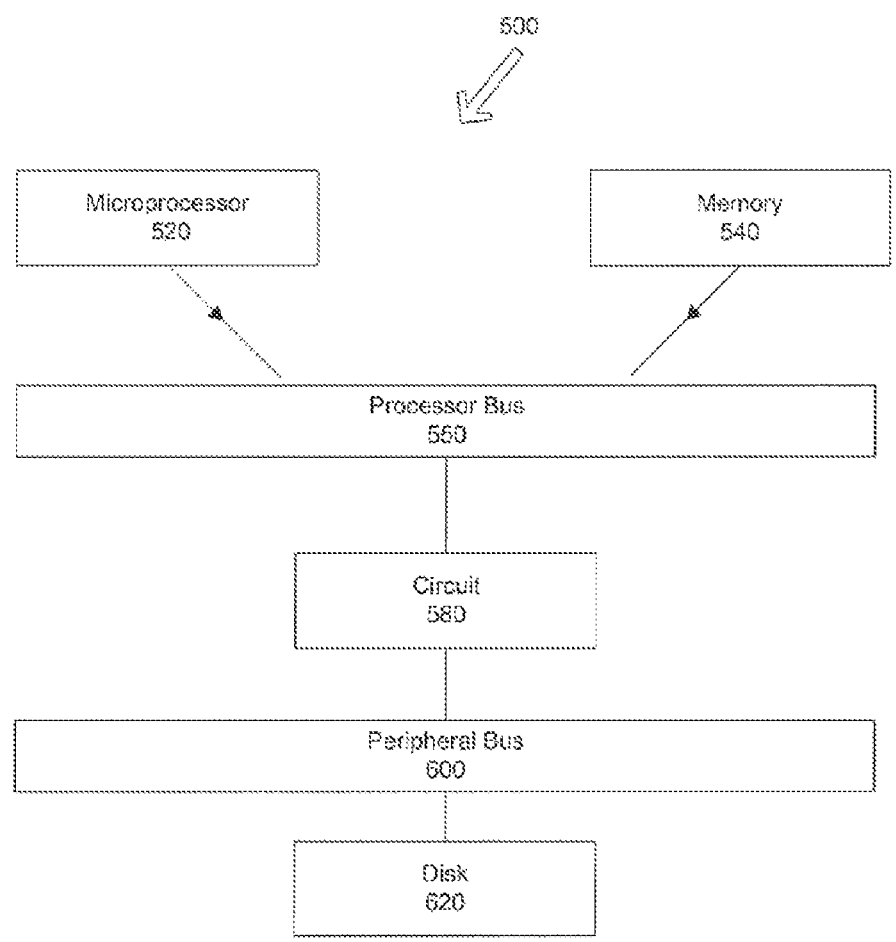
FIG. 6 is a schematic of the memory and hardware of a computer or handheld device such as a tablet or smartphone.
Figure 7:
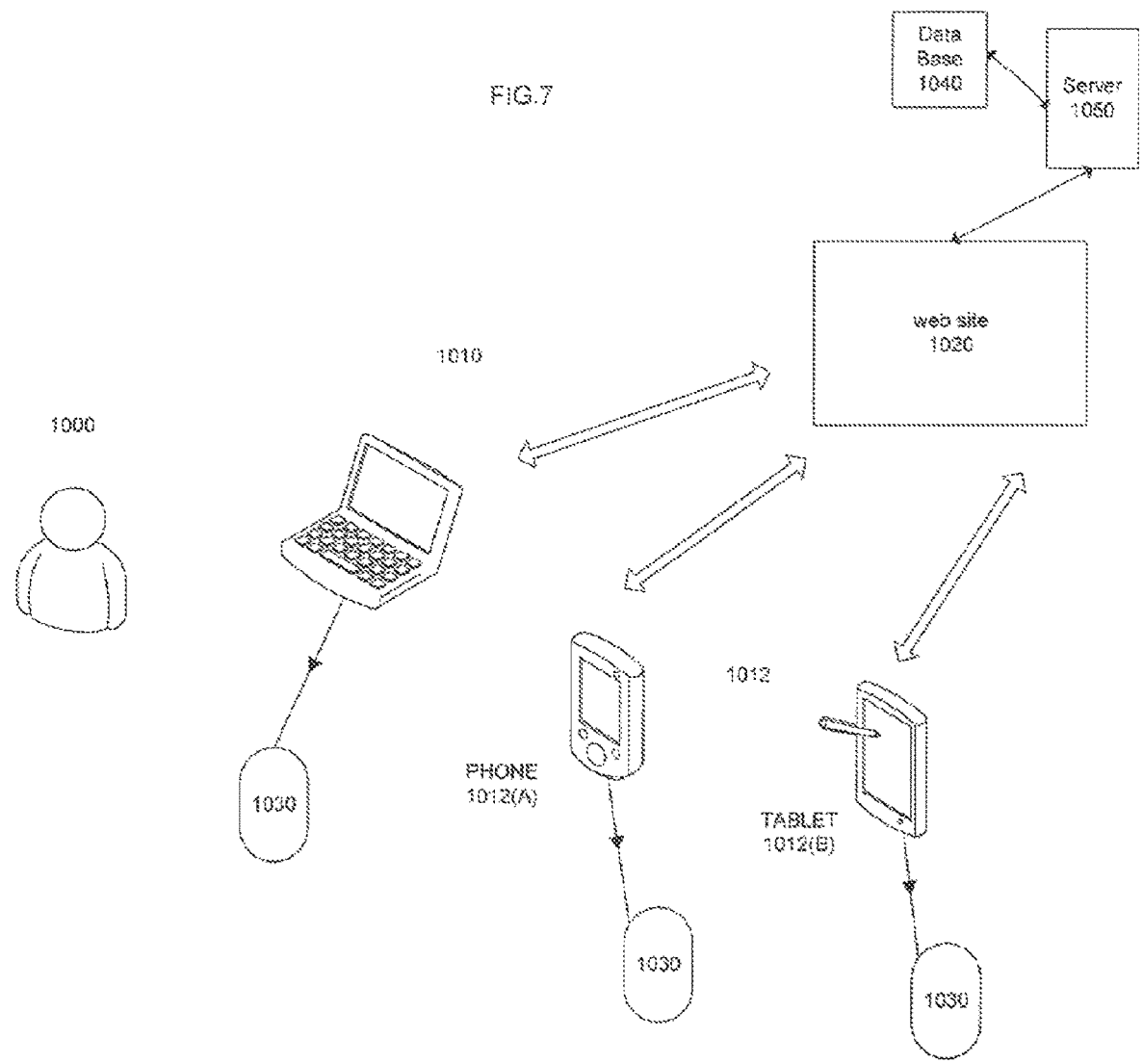
FIG. 7 is a schematic of an individual user operating a computer or handheld device connected to the internet.
Figure 8:
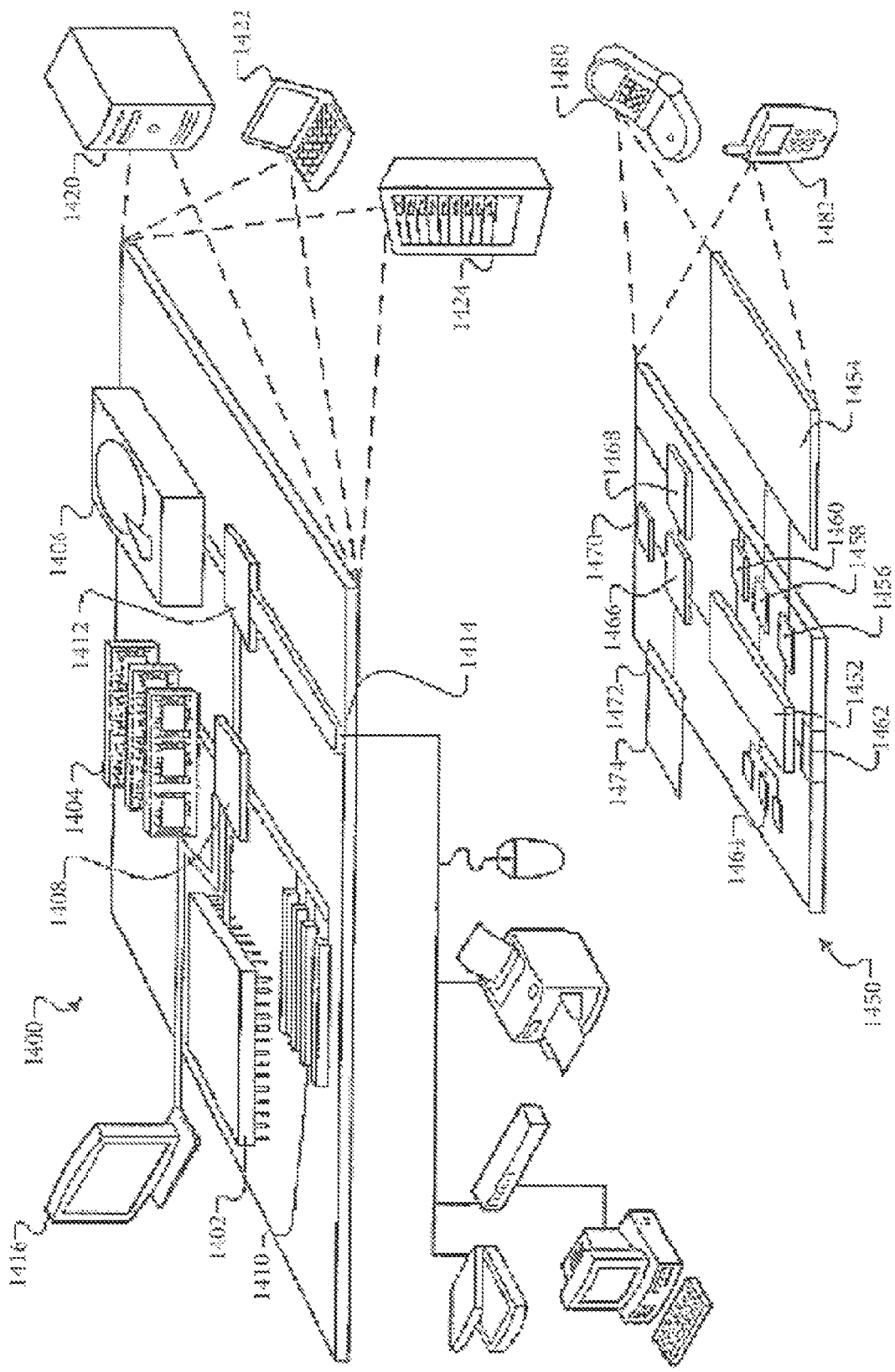
FIG. 8 illustrates computer devices.

The system and method of the present invention may be used with exemplary computer systems and devices as shown in FIGS. 6, 7, and 8. FIG. 6 illustrates a system 500 of a computer or device which includes a microprocessor 520 and a memory 540 which are coupled to a processor bus 560 which is coupled to a peripheral bus 600 by circuitry 580. The bus 600 is communicatively coupled to a disk 620. It should be understood that any number of additional peripheral devices are communicatively coupled to the peripheral bus 600 in embodiments of the invention. Further, the processor bus 560, the circuitry 580 and the peripheral bus 600 compose a bus system for computing system 500 in various embodiments of the invention. The microprocessor 520 starts disk access commands to access the disk 620. Commands are passed through the processor bus 560 via the circuitry 580 to the peripheral bus 600 which initiates the disk access commands to the disk 620. In various embodiments of the invention, the present system intercepts the disk access commands which are to be passed to the hard disk.

As shown generally by FIG. 7, there is a user 1000 of a computer 1010 or handheld device 1012 who accesses an Internet website 1020 with network connections to a server 1050 and database 1040. The computer 1010 or handheld device is compatible with operating systems known in the art, such as Windows, iOS or android devices or android type operating systems. The user 1000 is potentially exposed to many malicious or unsafe applications located on the web or a particular website 1020 due to lack of security and validation with the source, even though the website 1020 itself may be known as reliable and trusted. The website may be an application store or directory which includes other software applications for downloading. Similarly, receiving email may introduce unsafe internet links, applications and attachments to the user's computer or device. Those of skill in the art would recognize that the computer 1010 or hand held devices 1012a or 1012b each has a processor and a memory coupled with the processor where the memory is configured to provide the processor with executable instructions. A boot disk 1030 is present for initiating an operating system as well for each of the computer 1010 or hand held devices 1012. It should also be noted that as used herein, the term handheld device includes phones, smart phones, tablets, personal digital assistants, media and game players and the like. It should also be understood that the user's computer or device may be part of an internal network or system which is communicating with the Internet. As used throughout the specifications, the term "query" or "queries" is used in the broadest manner to include requests, polls, calls, summons, queries, and like terms known to those of skill in the art.

FIG. 8 shows an example of a computer device 1400 and a generic mobile computer device 1450, which may be used to implement the processes described herein, including the mobile-side and server-side processes for installing a computer program from a mobile device to a computer. Computing device 1400 is intended to represent various forms of digital computers, such as laptops, desktops, workstations, personal digital assistants, servers, blade servers, mainframes, and other appropriate computers. Computing device 1450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 1400 includes a processor 1402, memory 1404, a storage device 1406, a high-speed interface 1408 connecting to memory 1404 and high-speed expansion ports 1410, and a low speed interface 1412 connecting to low speed bus 1414 and storage device 1406. Each of the components 1402, 1404, 1406, 1408, 1410, and 1412 are interconnected using various busses, and may be mounted on a common motherboard or in other manners as appropriate. The processor 1402 can process instructions for execution within the computing device 1400, including instructions stored in the memory 1404 or on the storage device 1406 to display graphical information for a GUI on an external input/output device, such as display 1416 coupled to high speed interface 1408. In other implementations, multiple processors and/or multiple busses may be used, as appropriate, along with multiple memories and types of memory. Also, multiple computing devices 1400 may be connected, with each device providing portions of the necessary operations (e.g., as a server bank, a group of blade servers, or a multi-processor system).

The memory 1404 stores information within the computing device 1400. In one implementation, the memory 1404 is a volatile memory unit or units. In another implementation, the memory 1404 is a non-volatile memory unit or units. The memory 1404 may also be another form of computer-readable medium, such as a magnetic or optical disk.

The storage device 1406 is capable of providing mass storage for the computing device 1400. In one implementation, the storage device 1406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 1404, the storage device 1406, or memory on processor 1402.

The high speed controller 1408 manages bandwidth-intensive operations for the computing device 1400, while the low speed controller 1412 manages lower bandwidth-intensive operations. Such allocation of functions is exemplary only. In one implementation, the high-speed controller 1408 is coupled to memory 1404, display 1416 (e.g., through a graphics processor or accelerator), and to high-speed expansion ports 1410, which may accept various expansion cards (not shown). In the 10 implementation, low-speed controller 1412 is coupled to storage device 1406 and low-speed expansion port 1414. The low-speed expansion port 1414, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 1400 may be implemented in a number of different forms, as shown in the figure. For example, it may be implemented as a standard server 1420, or multiple times in a group of such servers. It may also be implemented as part of a rack server system 1424. In addition, it may be implemented in a personal computer such as a laptop computer 1422. Alternatively, components from computing device 1400 may be combined with other components in a mobile device (not shown), such as device 1450. Each of such devices may contain one or more of computing device 1400, 1450, and an entire system may be made up of multiple computing devices 1400, 1450 communicating with each other.

Computing device 1450 includes a processor 1452, memory 1464, an input/output device such as a display 1454, a communication interface 1466, and a transceiver 1468, among other components. The device 1450 may also be provided with a storage device, such as a Microdrive or other device, to provide additional storage. Each of the components 1450, 1452, 1464, 1454, 1466, and 1468 are interconnected using various busses, and several of the components may be mounted on a common motherboard or in other manners as appropriate.

The processor 1452 can execute instructions within the computing device 1450, including instructions stored in the memory 1464. The processor may be implemented as a chipset of chips that include separate and multiple analog and digital processors. The processor may provide, for example, for coordination of the other components of the device 1450, such as control of user interfaces, applications run by device 1450, and wireless communication by device 1450.

Processor 1452 may communicate with a user through control interface 1458 and display interface 1456 coupled to a display 1454. The display 1454 may be, for example, a TFT LCD (Thin-Film-Transistor Liquid Crystal Display) or an OLED (Organic Light Emitting Diode) display, or other appropriate display technology. The display interface 1456 may comprise appropriate circuitry for driving the display 1454 to present graphical and other information to a user. The control interface 1458 may receive commands from a user and convert them for submission to the processor 1452.

In addition, an external interface 1462 may be provided in communication with processor 1452, so as to enable near area communication of device 1450 with other devices. External interface 1462 may provide, for example, for wired communication in some implementations, or for wireless communication in other implementations, and multiple interfaces may also be used.

The memory 1464 stores information within the computing device 1450. The memory 1464 can be implemented as one or more of a computer-readable medium or media, a volatile memory unit or units, or a non-volatile memory unit or units. Expansion memory 1474 may also be provided and connected to device 1450 through expansion interface 1472, which may include, for example, a SIMM (Single in Line Memory Module) card interface. Such expansion memory 1474 may provide extra storage space for device 1450, or may also store applications or other information for device 1450. Specifically, expansion memory 1474 may include instructions to carry out or supplement the processes described above, and may include secure information also. Thus, for example, expansion memory 1474 may be provide as a security module for device 1450, and may be programmed with instructions that permit secure use of device 1450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1464, expansion memory 1474, memory on processor 1452, or a propagated signal that may be received, for example, over transceiver 1468 or external interface 1462.

Device 1450 may communicate wirelessly through communication interface 1466, which may include digital signal processing circuitry where necessary. Communication interface 1466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1468. In addition, short range communication may occur, such as using a Bluetooth, Wi-Fi, or other such transceiver (not shown). In addition, GPS (Global Positioning System) receiver module 1470 may provide additional navigation- and location-related wireless data to device 1450, which may be used as appropriate by applications running on device 1450.

Device 1450 may also communicate audibly using audio codec 1460, which may receive spoken information from a user and convert it to usable digital information. Audio codec 1460 may likewise generate audible sound for a user, such as through a speaker, e.g., in a handset of device 1450. Such sound may include sound from voice telephone calls, may include recorded sound (e.g., voice messages, music files, etc.) and may also include sound generated by applications operating on device 1450.

The computing device 1450 may be implemented in a number of different forms, as shown in the figure. For example, it may be implemented as a cellular telephone 1480. It may also be implemented as part of a smartphone 1482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" or "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "computer readable storage medium" may be any tangible medium (but not a signal medium—which is defined below) that can contain, or store a program. The terms "machine readable medium," "computer-readable medium," or "computer readable storage medium" are all non-transitory in their nature and definition. Non-transitory computer readable media comprise all computer-readable media except for a transitory, propagating signal.

The term "machine-readable signal" refers to any signal used to provide machine instructions and/or data to a programmable processor. A "computer readable signal medium" may be any computer readable medium that is not a computer readable storage medium and that can communicate, propagate, or transport a program.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention.

As would be understood in the art, the computer, the processor, microprocessor, controller, control unit or other programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, an artisan understands and appreciates that a "processor", "microprocessor" "controller", or "control unit" or "microcontroller" constitute hardware in the claimed disclosure that contain circuitry that is configured for operation with software or firmware, and may be construed as implicitly including Digital Signal Processor (DSP) hardware.

The definition of the terms "unit" or "module" as referred to herein is to be understood as constituting hardware circuitry such as a processor or microprocessor configured for a certain desired functionality, or a communication module containing hardware such as transmitter, receiver or transceiver, or a non-transitory medium comprising machine executable code that is loaded into and executed by hardware for operation.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Elements of different implementations described herein may be combined to form other implementations not specifically set forth above. Elements may be left out of the processes, computer programs, Web pages, etc. described herein without adversely affecting their operation. Furthermore, various separate elements may be combined into one or more individual elements to perform the functions described herein.

The invention is not restricted to the details of the foregoing embodiments. The invention extends to any novel one, or any novel combination, of the features disclosed in this specification (including any accompanying claims, abstract and drawings), or to any novel one, or any novel combination, of the steps of any method or process so disclosed.

What is claimed is:

1. A method of detecting script texts passed to interpreter and sending the script texts to security components comprising:

extracting embedded script from command line parameters or documents, where said embedded script is fileless, and a customized interceptor command line parser for different interceptors which accept script text as a parameter is used for said extracting, said customized interceptor command line parser is cmd.exe accepting bat scripts after /c and/k;

saving said embedded script to a script file, and passing a file path to security components for scanning, said security components comprising a scanner, a whitelist, or a sandbox, to detect attacks from said fileless embedded script;

reaching a verdict of allowing said embedded script execution, blocking said embedded script execution, or sending said embedded script to quarantine.

2. A method according to claim 1, where said embedded script is retrieved from said interpreter comprising:

starting said interpreter,
retrieving full command line parameters,
extracting embedded scripts from said full command line parameters,
checking if script text is a file path or name,
reporting file to said security components if said file can be used as script file, otherwise saving file to temporary script file and passing it to said security components.

3. A method according to claim 1, where multiple pieces of scripts are executed in a single command comprising:

intercepting script text,
saving all codes to a temporary script file,
passing a script file to said security components.

4. A method according to claim 1, where interceptors do not accept scripts as parameter comprising:

extracting full parameter,
treating parameter as embedded script,
saving said parameter to a script file,
reporting the script file,
passing said script file to said security components.

5. A method according to claim 1, where said embedded script is extracted from documents comprising:

launching in a text editor that supports active content,
detecting said embedded script,
saving said embedded script to a temporary embedded script file,
passing said embedded script file to said security components.

6. The method according to claim 1, where said embedded script text is extracted by:

checking if an interpreter is present;
parsing the command line of the interpreter;
checking said parsed interpreter command line for said embedded script;
saving said embedded script to a temporary script file and;
passing said temporary script file to said security components.

* * * * *